US009465500B2

(12) United States Patent
Hernandez et al.

(10) Patent No.: US 9,465,500 B2
(45) Date of Patent: Oct. 11, 2016

(54) TWO-TOUCH GESTURE DETECTION ON A FOUR-WIRE RESISTIVE TOUCHSCREEN

(75) Inventors: Eduardo Muriel Hernandez, Zapopan (MX); Juan Cazares Blanco, Zapopan (MX); Antonio Castro Trejo, Guadalajara (MX)

(73) Assignee: Freescale Semicondcutor, Inc., Austin, TX (US)

( * ) Notice: Subject to any disclaimer, the term of this patent is extended or adjusted under 35 U.S.C. 154(b) by 434 days.

(21) Appl. No.: 13/452,838

(22) Filed: Apr. 21, 2012

(65) Prior Publication Data
US 2013/0278541 A1   Oct. 24, 2013

(51) Int. Cl.
*G06F 3/045* (2006.01)

(52) U.S. Cl.
CPC ..... *G06F 3/045* (2013.01); *G06F 2203/04104* (2013.01)

(58) Field of Classification Search
CPC ............. G06F 3/045; G06F 2203/04104; G06F 2203/04113; G06F 3/0414
USPC ............. 345/173–178; 178/18.01–18.05
See application file for complete search history.

(56) References Cited

U.S. PATENT DOCUMENTS

2009/0322701 A1* 12/2009 D'Souza et al. ............. 345/174
2011/0019058 A1*  1/2011 Sakai ................. G06F 3/04847
                                                       348/333.01
2012/0249471 A1* 10/2012 Yi et al. ..................... 345/174

OTHER PUBLICATIONS

Toshiba Resistive Multi-Touch Screen. Mar. 8, 2011. http://www.cnx-software.com/2011/03/08/toshiba-resistive-multi-touch-screen/.
Semtech Expands the 4D-Touch Platform with Multi-Touch Support to Enhance the User Experience. Oct. 25, 2011 http://www.semtech.com/Press-Releases/2011/Semtech-Expands-the-4D-Touch-Platform-with-Multi-Touch-Support-to-Enhance-the-User-Experience.html.
Multi-Touch Controller for Resistive Touchscreen Displays Jun. 7, 2011 http://www.rohm.com/us/html/news/current/news-touch-sensor.html.
Multi-Touch 4 Wire Touch Panel (KTT-4W8.9K) http://kingtouch.en.made-in-china.com/offer/AMFERUTYjLpx/Sell-Multi-Touch-4-Wire-Touch-Panel-KTT-4W8-9K-.html.
Calpe, J. et al., "AD7879 Controller Enables Gesture Recognition on Resistive Touch Screens", http://www.analog.com/library/analogDialogue/archives/45-06/gesture_recognition.html, Analog Dialogue, 45-06, Jun. 2011, pp. 1-5.
Johnson, R., "Multi-touch added to resistive touchscreens", http://www.eetimes.com/document.asp?doc_id=1260910, Jan. 9, 2012, 4 pages.

* cited by examiner

*Primary Examiner* — Rodney Amadiz

(57) ABSTRACT

Embodiments of a touchscreen control device and associated method of operation enable two-touch gesture detection on a four-wires resistive touchscreen. Illustrative devices and methods enable detection when a resistive touchscreen is touched in two separate points. Embodiments of an electronic circuit can comprise a controller configured for coupling to a four-wires resistive touchscreen and at least two resistors. The controller can be further configured to detect multiple touches on the four-wires resistive touchscreen and measure zoom gestures comprising measuring distances between two-touches and obtaining angle of rotation and total distance between the two-touches.

14 Claims, 14 Drawing Sheets

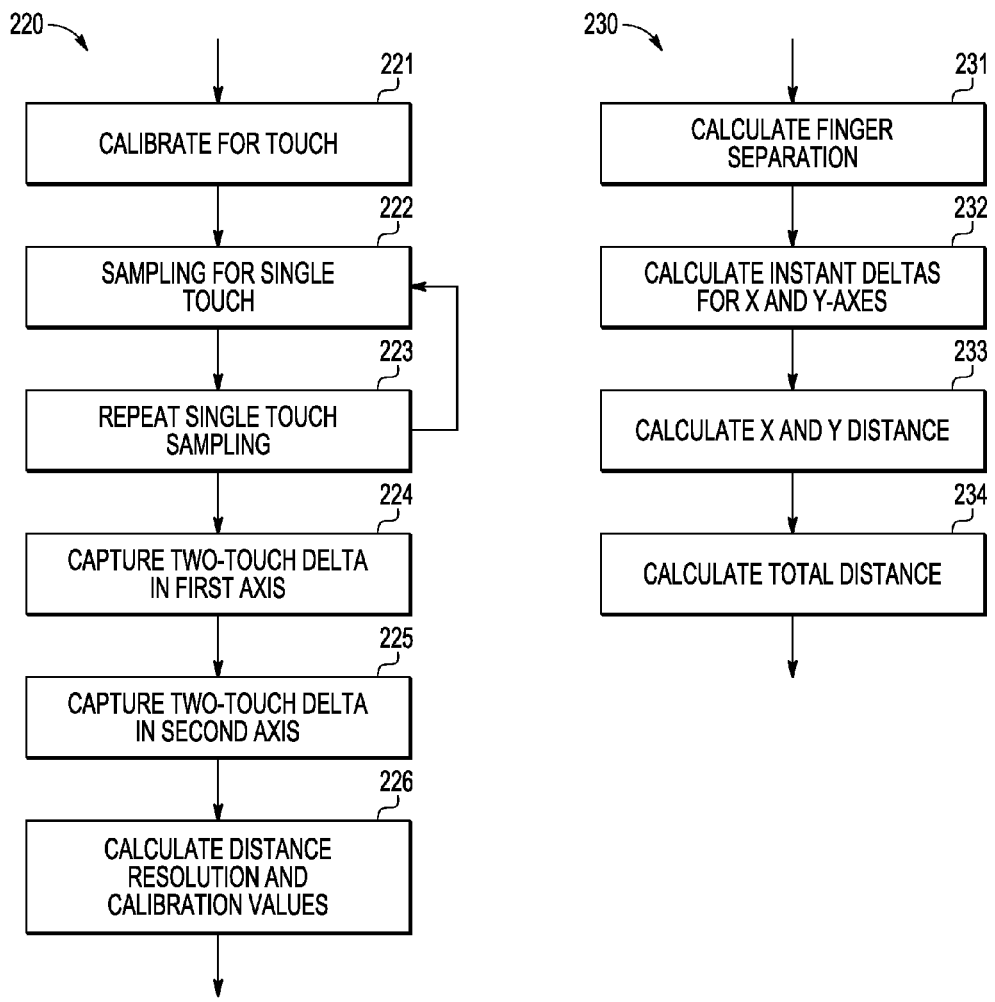
FIG. 2.1

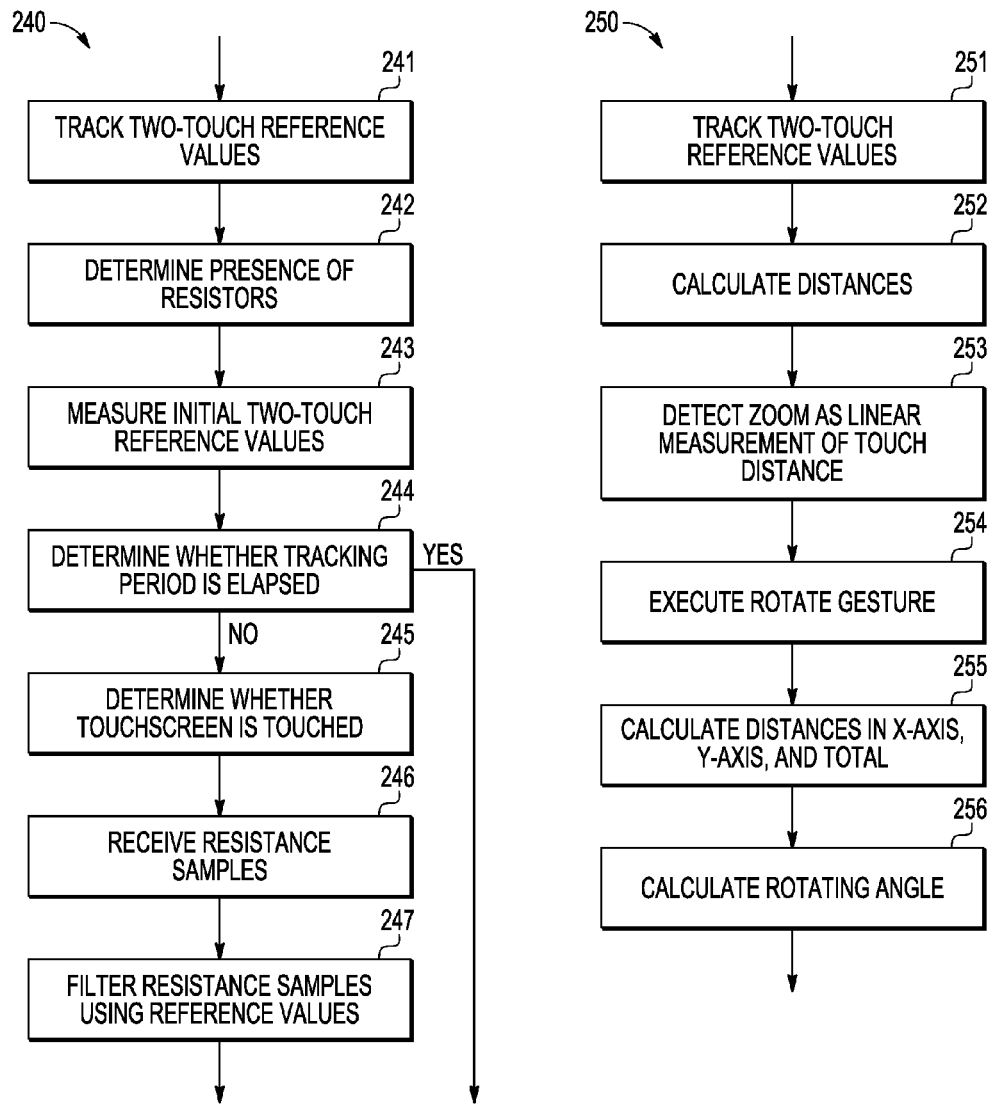
FIG. 2.2

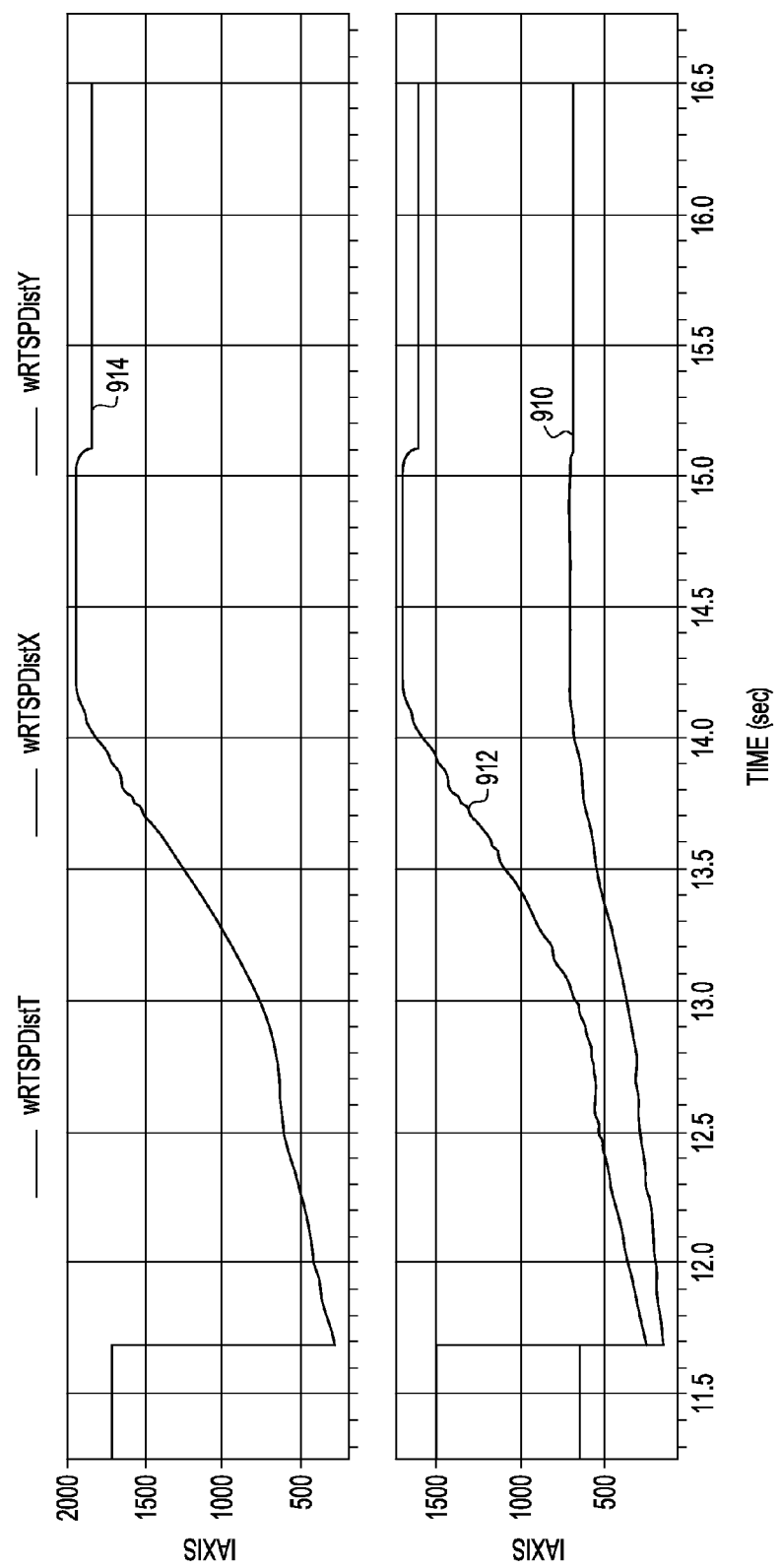
FIG. 9.1

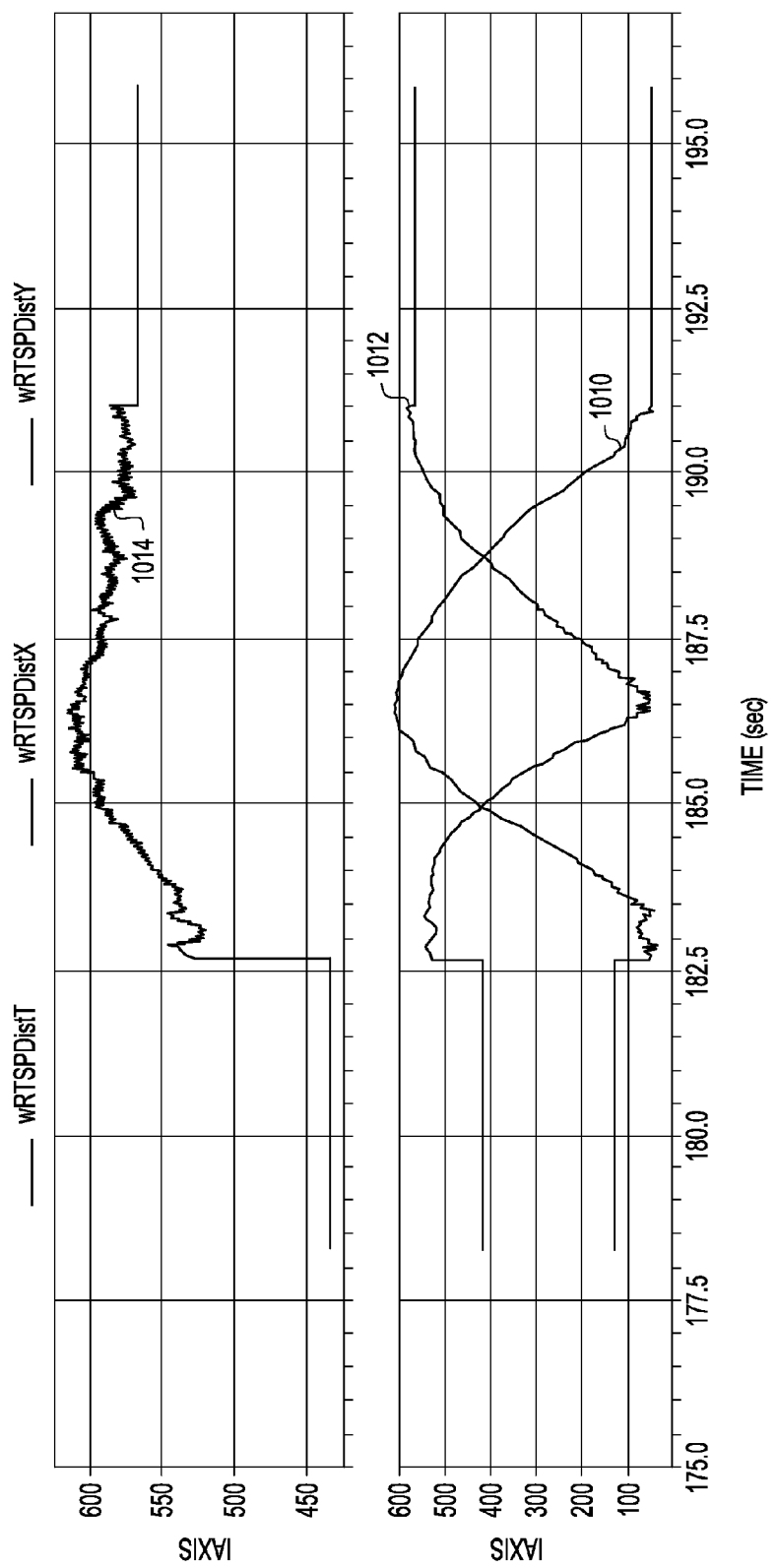
FIG. 10.1

TWO-TOUCH GESTURE DETECTION ON A FOUR-WIRE RESISTIVE TOUCHSCREEN

BACKGROUND

A touchscreen is an electronic visual display for detecting the presence and location of a touch within a display area. Generally, a touch refers to touching the display with a finger or hand but can also include touch contacts with other objects such as a stylus. Touchscreens are common in devices such as game consoles, smartphones, tablet computers, all-in-one computers, other computing devices, mobile devices, point-of-sales terminals, industrial control panels, and the like.

A touchscreen has attributes including functionality in enabling user interaction directly with a display rather than requiring a pointer controlled by a device such as a mouse or touchpad, and functionality in enabling user control without an intermediate handheld device. Touchscreen displays can be attached to computers or terminals for network usage. Touchscreen displays can be useful for digital appliances such as a personal digital assistant (PDA), mobile phone, satellite navigation devices such as (GPS), video games, and the like.

Usage of touchscreens is large and growing due to the popularity of portable and functional electronics including smartphones, information appliances, computers such as tablet computer, video game consoles, and similar electronic systems. Touchscreens enable display of a simple smooth surface and direct user interaction without any intermediate hardware such as a mouse or keyboard between the user and content, thereby enabling elimination of accessories. Touchcreens are highly useful not only for personal communication devices such as smartphones but also in heavy industry, medical devices, and kiosks for displays such as museum displays, and for room automation in which keyboard and mouse systems do not allow suitably accurate, intuitive, and rapid user interaction with display content.

BRIEF DESCRIPTION OF THE DRAWINGS

Embodiments of the invention relating to both structure and method of operation may best be understood by referring to the following description and accompanying drawings.

DETAILED DESCRIPTION

Figure 1:
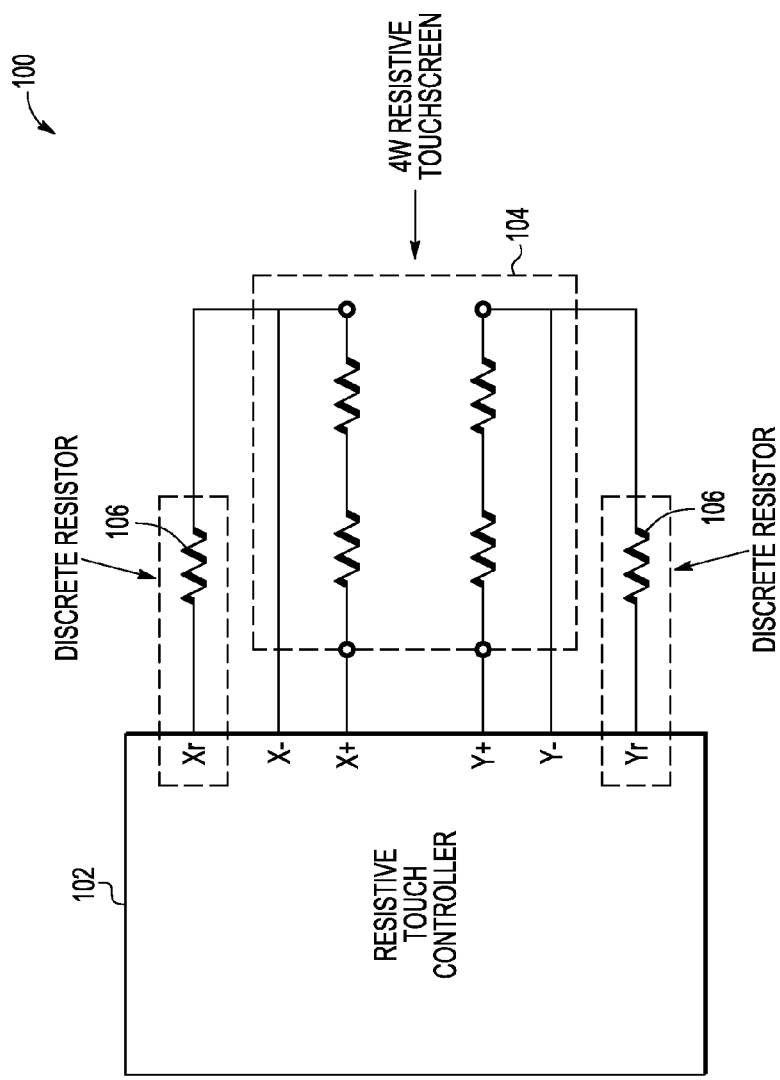
FIG. 1 is a schematic block and circuit diagram depicting an embodiment of an electronic circuit adapted for two-touch gesture detection on a four-wires resistive touchscreen.

Embodiments of a touchscreen control device and associated method of operation enable two-touch gesture detection on a four-wires resistive touchscreen. Illustrative devices and methods enable detection when a resistive touchscreen is touched in two separate points, further enabling detection of two-touch gestures including, for example, pinch, expand, and rotate on the four-wires resistive touchscreen.

The illustrative devices and control methods enable systems using resistive touchscreens to process two-touch gestures detection, facilitating implementation in applications such as computer tablets, smart phones, and other applications using operations such as rotate and zoom features. The disclosed systems and methods operate on resistive touchscreen technology that is distinct from and less expensive than typical capacitive touchscreen systems. In industrial and automotive application environments, capacitive touch sensing technologies are unsuitable due to the possible necessity of operating equipment with gloves which is inoperable using capacitive touch sensing. Systems and methods configured for usage with resistive touchscreens enable extension to new applications.

In an example, a resistive touchscreen is a touch-sensitive computer display formed of two flexible sheets coated with a resistive material and separated by an air gap or microdots. Two types of metallic layers can be used including matrix and analogue. In the matrix configuration, striped electrodes are formed on substrates such as glass or plastic wherein the electrodes of the two layers face one another. In the analogue configuration, transparent electrodes without patterning face one another. When the touchscreen is contacted or touched, the two sheets are pressed together. The two sheets have horizontal and vertical lines that, when pushed together, register the precise location of the touch. The touchscreen senses signals resulting from contact with nearly any object, for example finger, palm, pen, stylus, and the like. Thus, a resistive touchscreen is a passive technology.

In example operation of a four-wire touchscreen, a uniform, unidirectional voltage gradient is applied to the first sheet. When the two sheets are pressed together, the second sheet measures the voltage as distance along the first sheet, supplying an X-coordinate. Once the X-axis contact coordinate is acquired, a uniform voltage gradient is applied to the second sheet to ascertain the Y-coordinate. The signal acquisition occurs within a few milliseconds, registering the exact touch location during touch contact.

Resistive touchscreens generally have a high resolution, for example 4096×4096 DPI or higher, to facilitate accurate touch control. The resistive touchscreen responds to pressure on the screen surface rather than to electrical phenomena such as capacitive coupling so that contact can be made with a finger, even when gloved, or other pointing device. In contrast, a capacitive pointer has to be operated with a capacitive pointer such as a bare finger. Gloves cannot be used to operate capacitive touchscreens.

Embodiments of systems, user interface devices, and associated methods of operation enable detect multiple-touch gestures including zoom-in, zoom-out, rotate, and the like on a resistive touchscreen.

Embodiments of systems, devices, and associated methods of operation disclosed herein can add resistors, for example two external resistors, connected in series to a resistive touchscreen, along with a controller for processing touchscreen signals. The controller, for example implemented using software executed on processing circuits, firmware, logic, or the like, to receive the information from the resistive touchscreen and can process the information to detect two-touch gestures without, in some embodiments, the aid of any external active components such as operational amplifiers. Thus, the illustrative systems, devices, and techniques are capable of producing processed data that indicates zoom-in, zoom-out, rotate, and other functions corresponding to two-touch gestures detected by the controller and can be reported directly through communications such as serial communications to an external host.

Embodiments of systems, devices, and associated methods of operation can thus be used in devices such as application-specific devices that process data from the touchscreen to report two-touch gestures to an external host without requirement of further processing.

Disclosed embodiments of systems, devices, and associated methods of operation can combine the use of resistors, such as external resistors, to measure changes in the total resistance of a plane with algorithms to process the information to enable handling of various two-touch gestures.

Referring to FIG. 1, a schematic block and circuit diagram depicts an embodiment of an electronic circuit 100 adapted for two-touch gesture detection on a four-wires resistive touchscreen 104. In the illustrative device, two external resistors 106 are coupled in series to resistive circuits of the resistive touchscreen 104. Processing can be performed in a controller 102 or can be implemented on processing circuitry executing, for example, using software, firmware, microcode, or can be implemented with logic or other types of circuitry.

The illustrative electronic circuit 100 comprises a controller 102 configured for coupling to a four-wires resistive touchscreen 104 and at least two external resistors 106. The controller 102 can be further configured to detect multiple touches on the four-wires resistive touchscreen 104 and measure zoom gestures, for example by measuring distances between two-touches and obtaining the angle of rotation and total distance between the two-touches.

In some embodiments, the electronic circuit 100 can be formed such that the controller 102 is configured to execute two-touch detection including operations of calibrating to calculate a plurality of touch calibration values, monitoring for detection of touch of the four-wires resistive touchscreen 104, and comparing and debouncing instant resistance values against a two-touch threshold. The controller 102 can be further configured to monitor for two-touch detection, calculate touchscreen X-axis and Y-axis finger separation, and execute zoom and rotate detection.

In further embodiments, the electronic circuit 100 can be designed wherein the controller 102 is configured to execute two-touch detection including operations of calibrating to calculate a plurality of touch calibration values and calculating distance resolution and touch calibration values corresponding to the first axis and the second axis for squared equations. The operation of calibrating to calculate a plurality of touch calibration values can comprise sampling for a single touch, repeating sampling of the single touch multiple times, and capturing two-touch delta for maximum distance in a first axis. The operation of calibrating to calculate a plurality of touch calibration values can further comprise capturing two-touch delta for maximum distance in a second axis.

In other embodiments, the electronic circuit 100 can be formed wherein the controller 102 is configured to execute two-touch detection comprising the operations of calibrating to calculate two-touch calibration values, and calculating distance resolution and calibration values corresponding to the first axis and the second axis for squared equations. Calibrating to calculate two-touch calibration values can comprise sampling for a single touch, repeating sampling of the single touch multiple times, calculating a single touch reference value, capturing two-touch delta for maximum distance in a first axis, and capturing two-touch delta for maximum distance in a second axis.

In particular embodiments, the electronic circuit 100 can be designed wherein the controller 102 is configured to execute two-touch detection including operations of calculating touchscreen X-axis and Y-axis finger separation, and calculating total distance Calculating touchscreen X-axis and Y-axis finger separation can comprise calculating instant deltas for the X-axis and the Y-axis, and calculating X and Y distance wherein X-distance is equal to the square root of quantity delta X (dX) divided by a calibration value $K_X$ and Y-distance is equal to the square root of quantity delta Y (dY) divided by a calibration value $K_Y$.

In other particular embodiments, the electronic circuit 100 can be designed wherein the controller 102 is configured to execute two-touch detection including operations of tracking two-touch reference values, and filtering the resistance samples using reference values. Tracking two-touch reference values can comprise operations of determining whether the at least two external resistors are present, measuring initial two-touch reference values, determining whether a predetermined tracking period is elapsed, determining whether the four-wires resistive touchscreen 104 is touched, and receiving resistance samples. In some arrangements of the electronic circuit 100, the controller 102 can be configured to execute two-touch detection further comprising tracking two-touch reference values periodically in absence of touch.

In specific embodiments, the electronic circuit 100 can be formed wherein the controller 102 is configured to execute two-touch detection further including calculating distances according to a squared root function. For example, distances can be calculated according to a squared root function based on a Newton method or other suitable method.

Examples of the electronic circuit 100 can detect a zoom gesture. For example, embodiments of the electronic circuit 100 can be formed wherein the controller 102 is configured to execute two-touch detection further comprising detecting zoom as a linear measurement of touch distance by analyzing total distance.

Examples of the electronic circuit 100 can execute a zoom gesture. For example, embodiments of the electronic circuit 100 can be formed wherein the controller 102 is configured to execute two-touch detection further including executing a rotate gesture. Executing a rotate gesture can comprise operations of calculating distances in an X-axis and a Y-axis and total distance between touches, and calculating rotating angle. The rotating angle can be calculated, for example, using a fixed-point arctangent function atan 2.

In embodiments such as shown in FIG. 1, the electronic circuit can further comprise a four-wires resistive touchscreen 104, and at least two external resistors 106 coupled to the four-wires resistive touchscreen 104. The four-wires resistive touchscreen can comprise first and second terminals coupled to a first resistive sheet, and third and fourth terminals coupled to a second resistive sheet. The at least two external resistive elements can comprise a first external resistive element coupled to the first resistive sheet and a second external resistive element coupled to the second resistive sheet.

In some applications and/or embodiments, as illustrated in FIG. 1, the electronic circuit 100 can be formed wherein the controller 102 receives information from the resistive touchscreen 104 and processes the information to detect two-touch gestures in absence of external active components.

In further arrangements, the electronic circuit 100 can be formed such that the controller 102 receives information from the resistive touchscreen 104 and processes the information to detect zoom-in, zoom-out, and rotate two-touch gestures. The controller 102 can be configured to report the processed information through serial communications to an external host.

Figure 2:
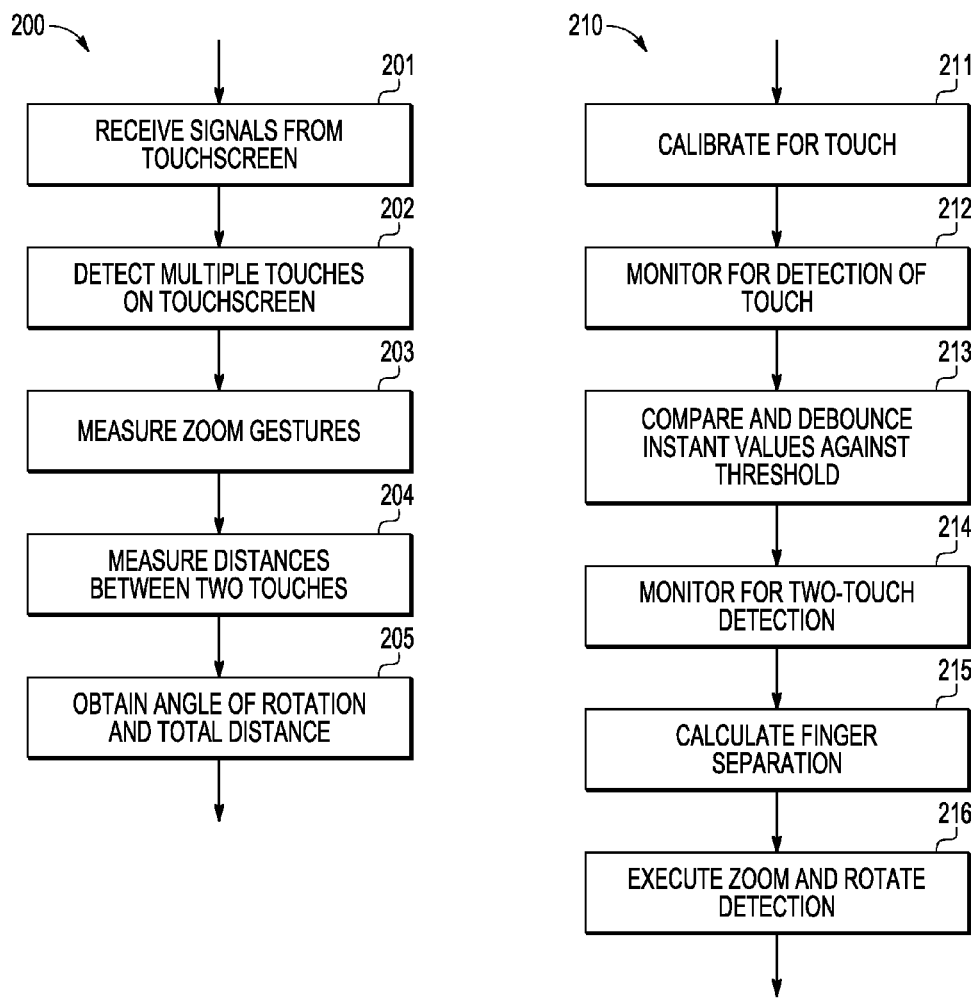
FIG. 2, including FIGS. 2.1 and 2.2, are schematic flow diagrams illustrating aspects of one or more embodiments for performing two-touch detection.

Referring to FIG. 2, including FIGS. 2.1 and 2.2, schematic flow diagrams illustrate aspects of one or more embodiments for performing two-touch detection. Embodiments of a method 200 for performing two-touch gesture detection can comprise receiving 201 signals from a four-wires resistive touchscreen and at least two external resistors, detecting 202 multiple touches on the four-wires resistive touchscreen, and measuring 203 zoom gestures comprising measuring 203 zoom gestures can further comprise measuring 204 distances between two-touches, and obtaining 205 angle of rotation and total distance between the two-touches.

In some arrangements, an embodiment of a method 210 for performing two-touch gesture detection can further comprise calibrating 211 to calculate a plurality of touch calibration values, monitoring 212 for detection of touch of the four-wires resistive touchscreen, and comparing and debouncing 213 instant resistance values against a two-touch threshold, for example setting the threshold to account for bounce or chatter in the resistive connection induced by touch. The method 210 can further comprise monitoring 214 for two-touch detection, calculating 215 touchscreen X-axis and Y-axis finger separation, and executing 216 zoom and rotate detection.

Furthermore, an embodiment of a method 220 for performing two-touch gesture detection can further comprise calibrating 221 to calculate a plurality of touch calibration values. Calibrating 221 to calculate a plurality of touch calibration values can comprise sampling 222 for a single touch, repeating 223 sampling of the single touch multiple times, and capturing 224 two-touch delta for maximum distance in a first axis. Calibrating 221 to calculate a plurality of touch calibration values can further comprise capturing 225 two-touch delta for maximum distance in a second axis, and calculating 226 distance resolution and calibration values corresponding to the first axis and the second axis for squared equations.

In addition, an embodiment of a method 230 for performing two-touch gesture detection can further comprise calculating 231 touchscreen X-axis and Y-axis finger separation. Calculating 231 touchscreen X-axis and Y-axis finger separation can comprise calculating 232 instant deltas for the X-axis and the Y-axis, calculating 233× and Y distance wherein X-distance is equal to the square root of quantity delta X (dX) divided by a calibration value KX and Y-distance is equal to the square root of quantity delta Y (dY) divided by a calibration value KY, and calculating 234 total distance.

In some arrangements, an embodiment of a method 240 for performing two-touch gesture detection can further comprise tracking 241 two-touch reference values. The operation of tracking 241 two-touch reference values can comprise determining 242 whether the at least two external resistors are present, measuring 243 initial two-touch reference values, and determining 244 whether a predetermined tracking period is elapsed. Tracking 241 two-touch reference values can further comprise determining 245 whether the four-wires resistive touchscreen is touched, receiving 246 resistance samples, and filtering 247 the resistance samples using reference values.

During a single touch event, the total resistance of the plane is not modified because no parallel resistance is created. The single touch resistance is the resistance between $R_{xr}$ or $R_{yr}$ and X+ or Y+, respectively, shown in FIG. 4. Because total plane resistance is not modified, the voltage in $R_{xr}$ or $R_{yr}$ is constant, and the value is used as the single-touch reference. When two touches are present on the screen, the parallel resistance created reduces the total resistance (as exists in the single-touch case), elevating the voltage in $R_{xr}$ or $R_{yr}$, measured in X− or Y−. The reduced voltage is compared to the reference to determine whether the difference is sufficient for detecting a two-touch event. The voltage difference may be as low as units of millivolts.

The filtering 247 of the resistance samples using reference values addresses variations due to noise of the theoretically constant voltage in $R_{xr}$ or $R_{yr}$ for single touches. Noise generally arises from temperature and/or electrical conditions. In an example embodiment, an Infinite Impulse Response (IIR) filter can be used to both reduce high frequency noise and track slow changes (typically in the order of seconds) due to temperature and/or electrical variations. Over the life of the resistive screen, the resistance of the screen is also modified due to wearing of resistive materials forming sheets of the screen. The filtering 247 also compensates for resistance changes resulting from wearing. In a particular embodiment, a sample can be acquired, for example, every 100 milliseconds if the screen is detected to be without touches to ensure that the only resistance connected to $R_{xr}$ or $R_{yr}$ is the resistance of the corresponding plane. The IIR filter can be a first-order low-pass filter with a B value of 32. In other embodiments, the filter can be any type of low-pass filter.

In addition, an embodiment of a method 250 for performing two-touch gesture detection can further comprise tracking 251 two-touch reference values periodically in absence of touch, and calculating 252 distances according to a squared root function. In various embodiments, distances can be calculated 252 according to a square root function based on a Newton method or other suitable method. The method 250 for performing two-touch gesture detection can further comprise detecting 253 zoom as a linear measurement of touch distance by analyzing total distance, and executing 254 a rotate gesture. Executing 254 a rotate gesture can comprise calculating 255 distances in an X-axis and a Y-axis and total distance between touches, and calculating 256 rotating angle. The rotating angle can be calculated 256, for example, using a fixed-point arctangent function atan 2 or other suitable function.

Figure 3:
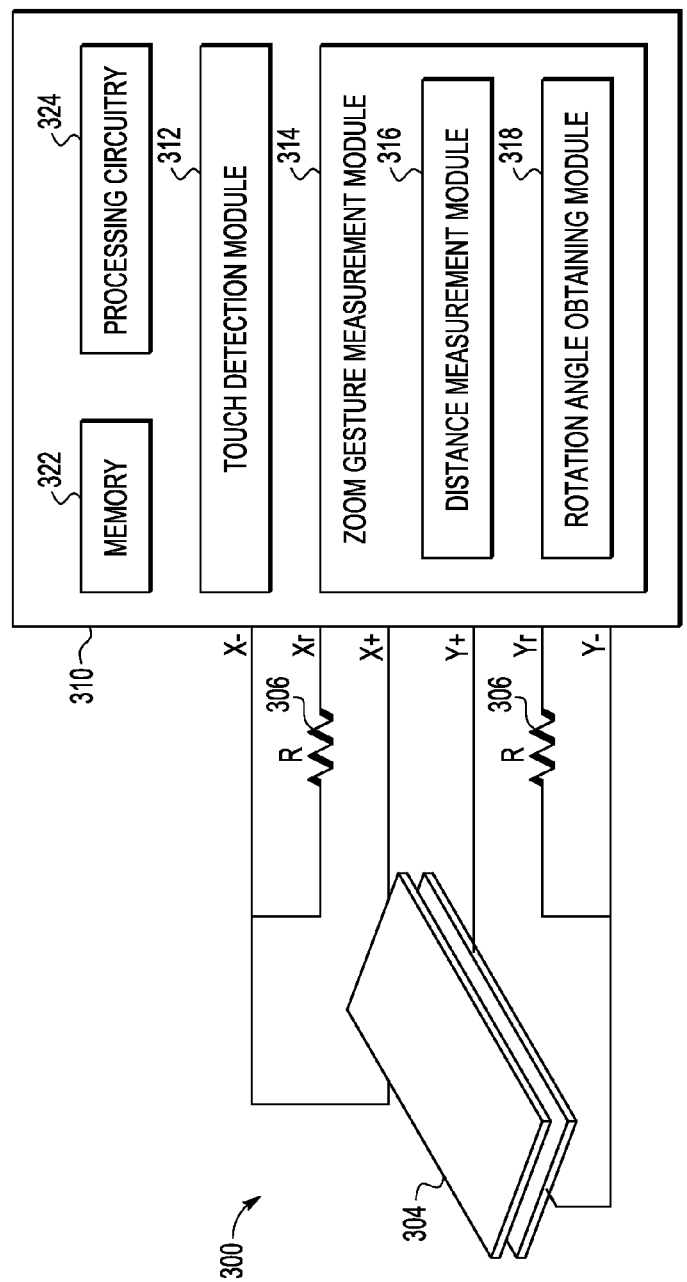
FIG. 3 is a schematic block and circuit diagram showing an embodiment of an electronic circuit adapted for two-touch gesture detection on a four-wires resistive touchscreen.

Referring to FIG. 3, a schematic block and circuit diagram depicts an embodiment of an electronic circuit 300 adapted for two-touch gesture detection on a four-wires resistive touchscreen 304. The illustrative electronic circuit 300 can comprise controller 310 for coupling to a four-wires resistive touchscreen 304 and at least two external resistors 306, module 312 for detecting multiple touches on the four-wires resistive touchscreen 304, and module 314 for measuring zoom gestures. The module 314 for measuring zoom gestures can comprise module 316 for measuring distances between two-touches, and module 318 for obtaining angle of rotation and total distance between the two-touches.

In one embodiment, the modules 312-318 can be implemented by controller 310 executing code such as software or firmware for performing the activities of the module function. In one embodiment, controller 310 can include processing circuitry 324 for executing the functions of the modules 312-318. In another embodiment, controller 310 can be a processor that processes code for performing the functionality of the modules 312-318 which is stored in memory 322. In various embodiments, the controller 310 can be implemented on any suitable processor or core and the functionality implemented using any suitable language. For example in a specific embodiment, the controller 310 can be a Freescale V1 Coldfire Processor made available by Freescale™ Semiconductor of Austin, Tex., and the functionality written in C and assembly languages. Although the external resistors 306 and resistances in the touchscreen can have any suitable resistance values, in an example embodiment the external resistors 306 can have resistance values of 510 ohms and the screens can have resistances in the order of 300 to 700 ohms. The values of touch resistance, the resistance between the screen layers for each touch, are generally about 1 k ohms.

Figure 4:
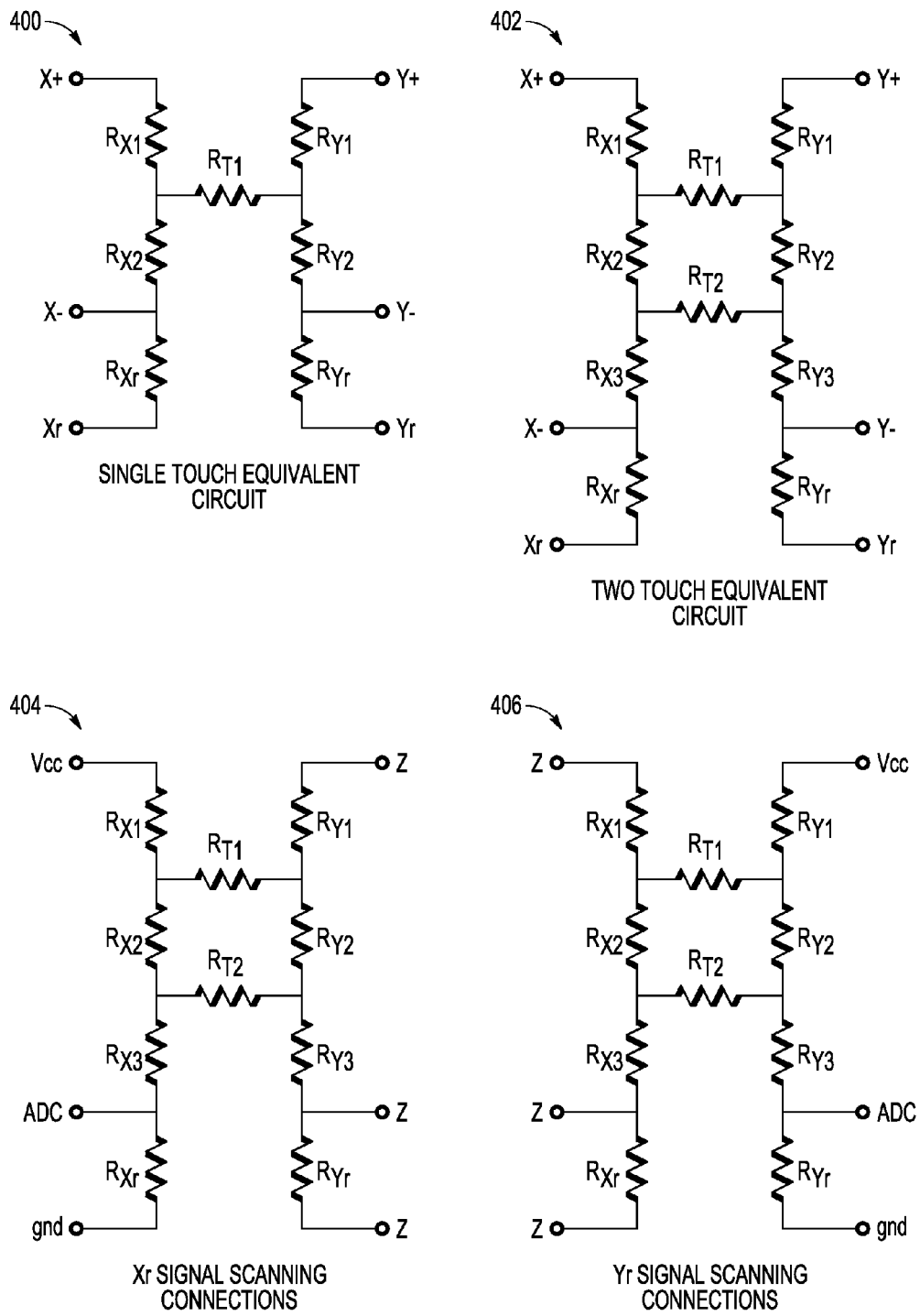
FIG. 4 depicts schematic circuit diagrams that enable observation of the measured changes in the equivalent resistance of the plane.

Resistors, such as the external resistors 106 depicted in FIG. 1, can be used to measure changes in the equivalent resistance of a plane formed by the resistive touchscreen 104 due to the effect of a second touch. FIG. 4 shows schematic circuit diagrams that enable observation of the measured changes in the equivalent resistance of the plane. A single-touch equivalent circuit 400 and shows how the equivalent circuit is formed for a single touch. On the left side is resistor $R_{X1}$ and resistor $R_{X2}$ which make up the total resistance of the X-layer (plane) of the touchscreen. On the lower portions of the circuit are the additional or external resistor $R_{Xr}$ which facilitates two-touch functionality. The right side of the equivalent circuit mirrors the left and corresponds to the Y-layer (plane), including resistor $R_{Y1}$ and resistor $R_{Y2}$ forming the total resistance of the Y-layer (plane). In the middle is the resistance $R_{T1}$ formed at the point where the screen is touched. Only one resistor $R_{T1}$ is included because only one touch occurs.

A two-touch equivalent circuit 402 includes resistances presented when two touches occur. One additional resistor $R_{T2}$ in the center represents the second touch. The second touch resistance $R_{T2}$ interposes an additional resistance in the total resistance in the X-layer and the Y-layer. Accordingly, an additional resistance in the X-plane is added so that the total resistance includes resistances $R_{X1}$ and $R_{X2}$ and $R_{X3}$, and an additional resistance in the Y-plane is added so that the total resistance includes resistances $R_{Y1}$ and $R_{Y2}$ and $R_{Y3}$. Thus, resistances $R_{X1}+R_{X2}$ in the one-touch circuit is nominally equal resistances $R_{X1}+R_{X2}+R_{X3}$ in the two-touch for the X-layer. Resistances $R_{Y1}+R_{Y2}$ in the one-touch circuit is nominally equal resistances $R_{Y1}+R_{Y2}+R_{Y3}$ in the two-touch for the Y-layer. The total resistance in the plane does not vary with the number of touches.

$X_R$ signal scanning directions 404 depict an equivalent circuit in the X-plane. YR signal scanning directions 406 illustrate an equivalent circuit in the Y-plane. The two diagrams 404 and 406 respectively show $X_R$ signal scanning connections and $Y_R$ signal scanning connections. The two-touch equivalent circuits show how the signals are polarized to obtain each of the samples for the X and Y-planes including the external resistor $R_{Xr}$. An analog-to-digital converter (ADC) shows where the sample is acquired.

Figure 5:
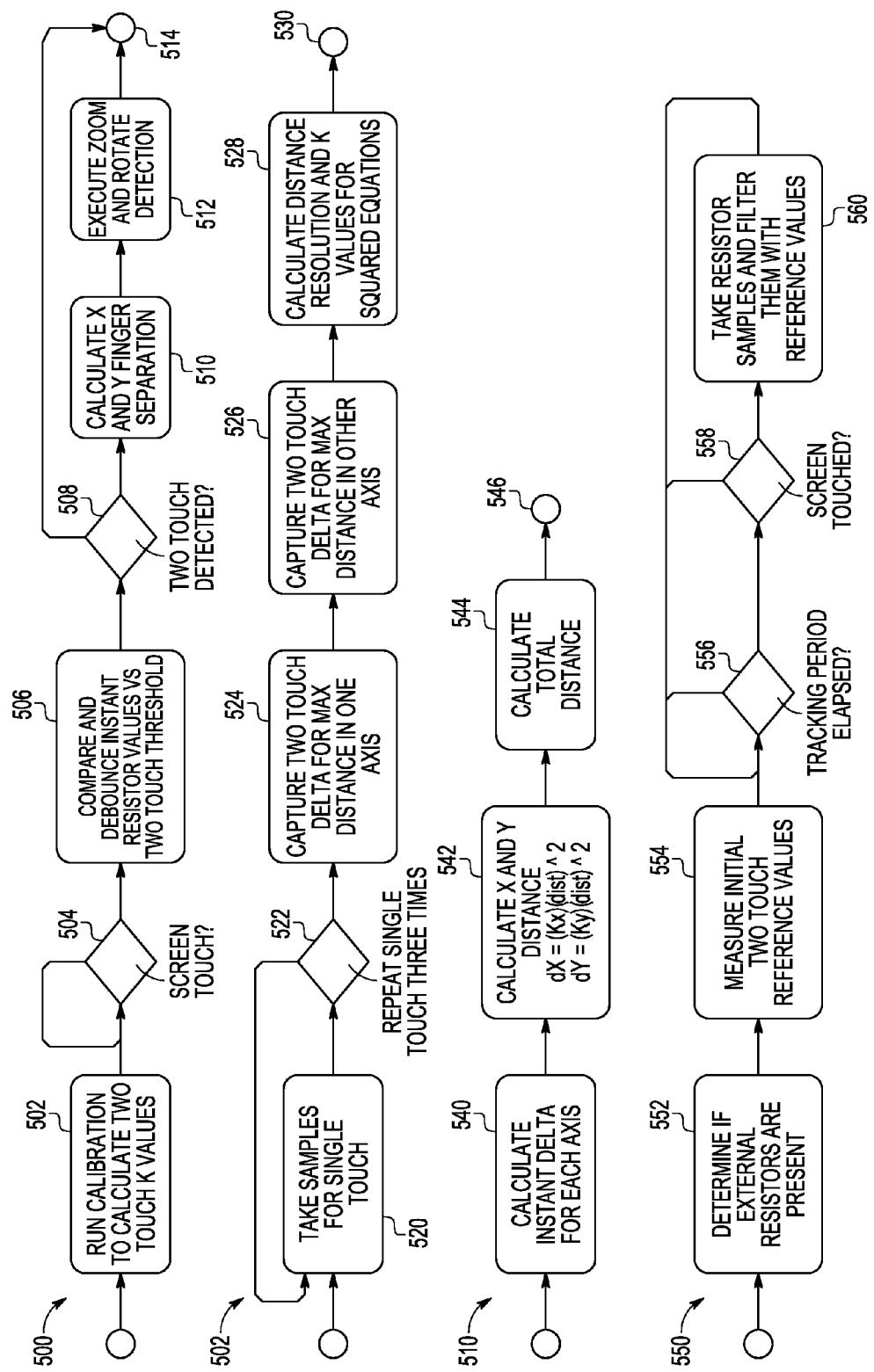
FIG. 5 includes schematic flow diagrams depicting an embodiment of a method for performing two-touch detection.
Figure 6:
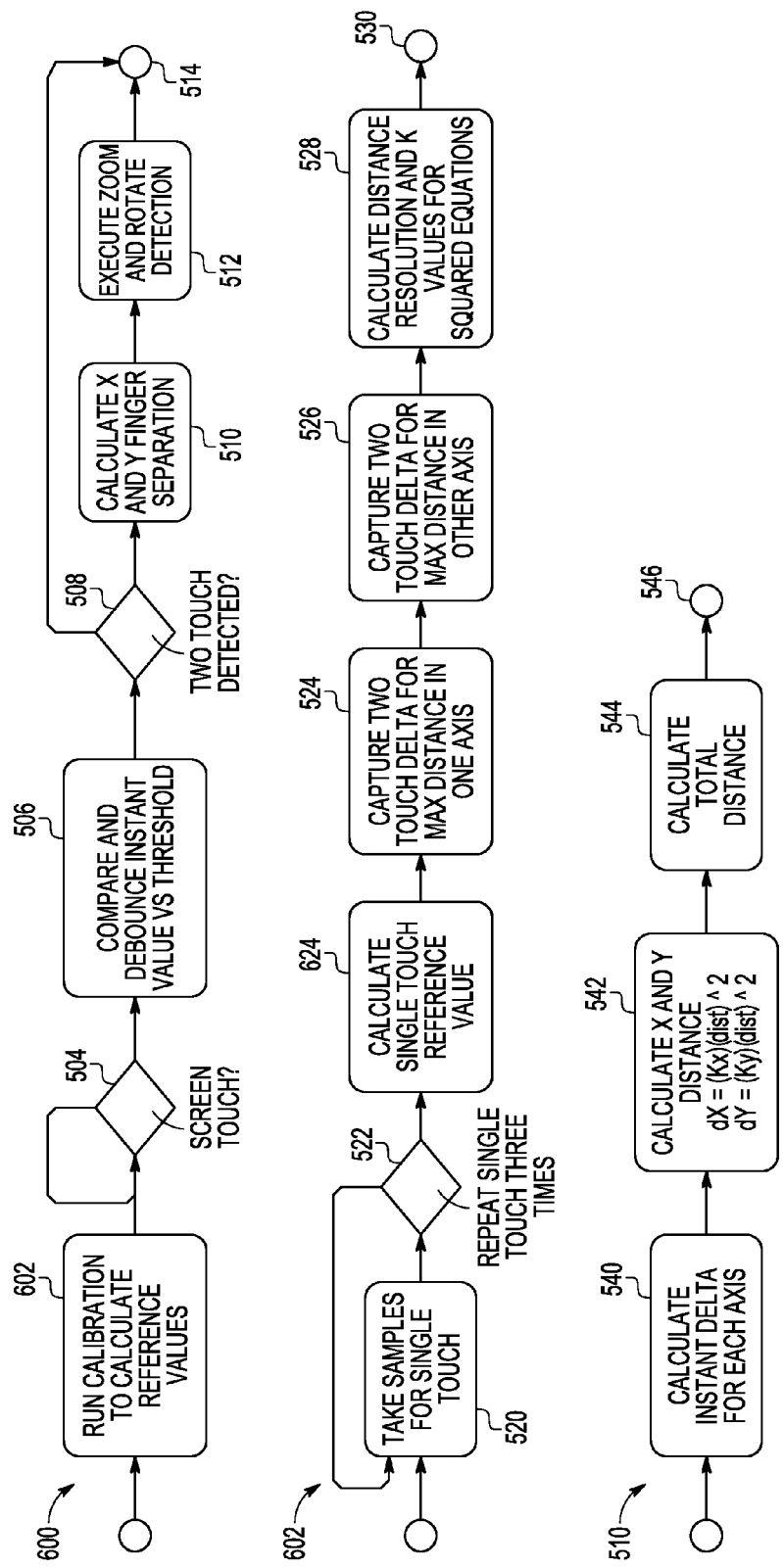
FIG. 6 includes schematic flow diagrams illustrating another embodiment of a method for performing two-touch detection.

Illustrative methods such as those described in FIG. 5 and FIG. 6 enable detection of multiple touches on a four-wires resistive touchscreen, and can include a set of algorithms to process the signals to measure distances between two touches and obtain angle of rotation and total distance between the touches to measure zoom gestures. The depicted methods are useful for operations of touchscreens including resistive gestures detection, resistive multitouch gestures, and the like.

Referring to FIG. 5, schematic flow diagrams depict an embodiment of a method for performing two-touch detection. A flowchart for two-touch detection 500 illustrates how the gestures are reported. In a first operation 502, calibration is run to calculate two-touch K values. The calibration is run to calculate values that are used to calculate the distances between the fingers, thus measuring the distances between the touches. Then, when the system is running, the screen is checked for touches 504 in the illustrative decision box. After determining that the screen is touched 504, the resistor values that are read are compared 506 to a reference value and compared to a threshold so that the system can determine whether a touch is a single touch or a double touch. Accordingly, the system compares and debounces instant value against threshold 506. Then if no double touch is detected 508, the double touch process ends and the single touch process continues independently 514. But if two-touches are detected 508, the finger separation is calculated 510 in both X and Y-axes. Once the X and Y finger separation values are obtained 510, the algorithms for the zoom and rotate detection are executed separately 512 to report the two gestures based on the distances between the fingers.

A flowchart for an embodiment of a calibration process 502, showing or detailing the first box of the first flow chart illustrating the calibration process 502. The calibration is performed both for single touch and double touch gestures. First samples are taken for single touches 520, for example by pressing three different points on the screen as indicated by a loop with repetition of single touch three times 522. After the three touches 522, the extreme points in the screen are pressed. Both sides are pressed. A double touch is created with the maximum distance in that axis 524, then the same operation is performed in the second axis 526, giving information to calculate 528 what is specified as a K value. In an example embodiment, a constant in a squared equation can be used to find the distances. The calibration process is thus concluded 530. The values can be stored in nonvolatile memory.

A flowchart for performing finger distance calculation 510 and illustrates how the distance is calculated. First, an instant delta value is calculated 540 for each axis. Once the samples from the internal resistors are acquired, the difference between the samples and the reference value is obtained 542 and that value (the delta) is used as the input to calculate 544 the X and Y distances. Thus, X and Y distance are calculated using an equation such as dX=(KX) dist2 and dY=(KY)dist2 between the fingers. Deltas dX and dY correspond to the differences between the instant values and the reference value for the resistors. The coefficients KX and KY are the reference values calculated during calibration and the distance is the value to be determined. Thus the distance values are obtained using the equation. A square root can be calculated in the device and can be used to determine the actual distance. Once the distances are calculated 542, the total distance can be determined 544 and the square root of X2+Y2 can be calculated as well and then used for zoom detection. The radial distances in X and Y can be used for the rotate detection in which the rotated angle is calculated using a fixed point implementation of an arctangent (atan 2) function or other suitable function. At the end of the routine 546, the angle between the fingers that are pressed can be determined.

A flowchart depicts tracking of the two-touch reference values. The tracking operation can be executed periodically when the screen is not touched. The illustrative tracking technique improves proper differentiation between single-touch and two-touch gestures. The flowchart illustrates how the reference values are tracked in a flowchart for tracking of the two-touch reference values 550. Reference values are calculated and the tracking process is only executed when no touch is detected in the screens. At the beginning, the system starts and determines whether the external resistors are present 552. The resistors are optional. For example, if the system is intended only for single touch, the external resistors can be omitted. Thus, the system determines whether the resistors are present 552. Then, the initial reference value can be measured in the measure initial two-touch reference values operation 554, thus determining the voltage of the resistors. In a fixed period shown by the tracking period elapsed decision box 556, the system determines whether the screen has been touched—the screen touched decision box 558. If the screen is not touched, the system can take the samples of the voltage in the resistors and execute a filter 560 to track the value because of variance with temperature, for example. Accordingly, the reference values are determined.

The tracking technique produces a reference value to determine whether the gesture is single or double touch.

Accordingly, the reference values are added signals, here called $X_R$ and $Y_R$, that be used in the illustrative devices to enable or disable the added resistors to avoid interference with single-touch measurements.

Referring to FIG. 6, schematic flow diagrams illustrate another embodiment of a method for performing two-touch detection. In contrast to the method depicted in FIG. 5, a reference value or coefficient is determined in the calibration process rather than in a separate tracking operation. The two illustrative embodiments can differ in selected operations. For example, the calibration process 602 can determine the reference value or coefficient rather than by determining reference values in independent tracking. In the calibration process 602, a single touch reference value can be determined 624.

Calculation 624 of the single touch reference value during calibration can be suitable in some applications but can be less suitable for systems in which calibration values can vary over time. One calibration is used for single touch. In the single touch calibration, samples are taken from the external resistors and used to determine the reference values for single touch. During the calibration, three single touch values are calculated from samples and averaged to determine the single touch value which can be used as a reference and stored in nonvolatile memory. Eventually the reference values can change due to electrical and temperature variations. These variations may call for continuous calibration or a continuous-use reference value sampling as enabled by the method illustrated in FIG. 5.

In an illustrative embodiment, calibration can be executed upon triggering by the user. For example, calibration can be performed in the factory when final application devices and systems can be manufactured with a touchscreen device. A manufacturer of application systems can run a process for calibrating the screen. Screens are calibrated for single touch. The illustrative process, for example performed in an application device factory, can be used to calibrate for single touch and double touch. In another example, calibration can be run by setting a bit in a register of the device which triggers a self-calibration process.

In other optional or possibly less common usage, calibration can be run periodically rather than only at manufacture in case systems go out of calibration during usage. Typically, a touchscreen wears out approximately in the same time frame as the lifetime of the product incorporating the touchscreen so that periodic calibration is unnecessary.

Figure 7:
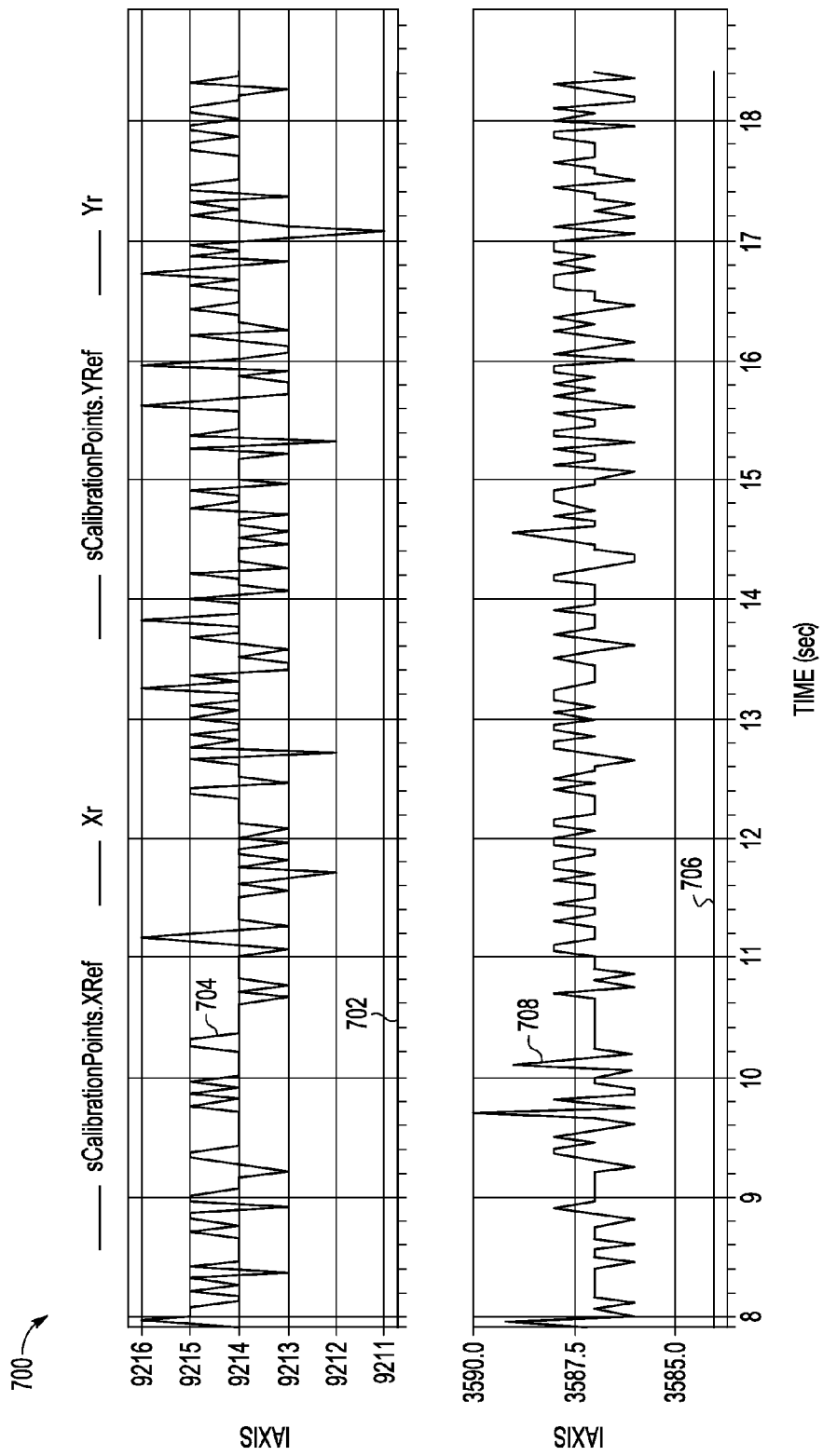
FIG. 7 is a graph illustrating an example of captured signals for various system actions, more specifically signals produced for single touch showing reference values calculated on calibration and instant signals.

Referring to FIG. 7, a graph illustrates an example of captured signals for various system actions, more specifically signals produced for single touch showing reference values calculated on calibration and instant signals. The graph 700 shows reference values and the instant signal for a single touch. The noisy, changing signal is the instant signal and the relatively constant signal is the reference. For example, the X-plane signals are shown including the reference values 702 and the instant signals 704. Similarly, the Y-plane signals are shown including the reference values 706 and the instant signals 708. In the illustrative example, variation in the instant values for the X-axis and Y-axis values are is less than about six units, which is typically less than the touch threshold.

Figure 8:
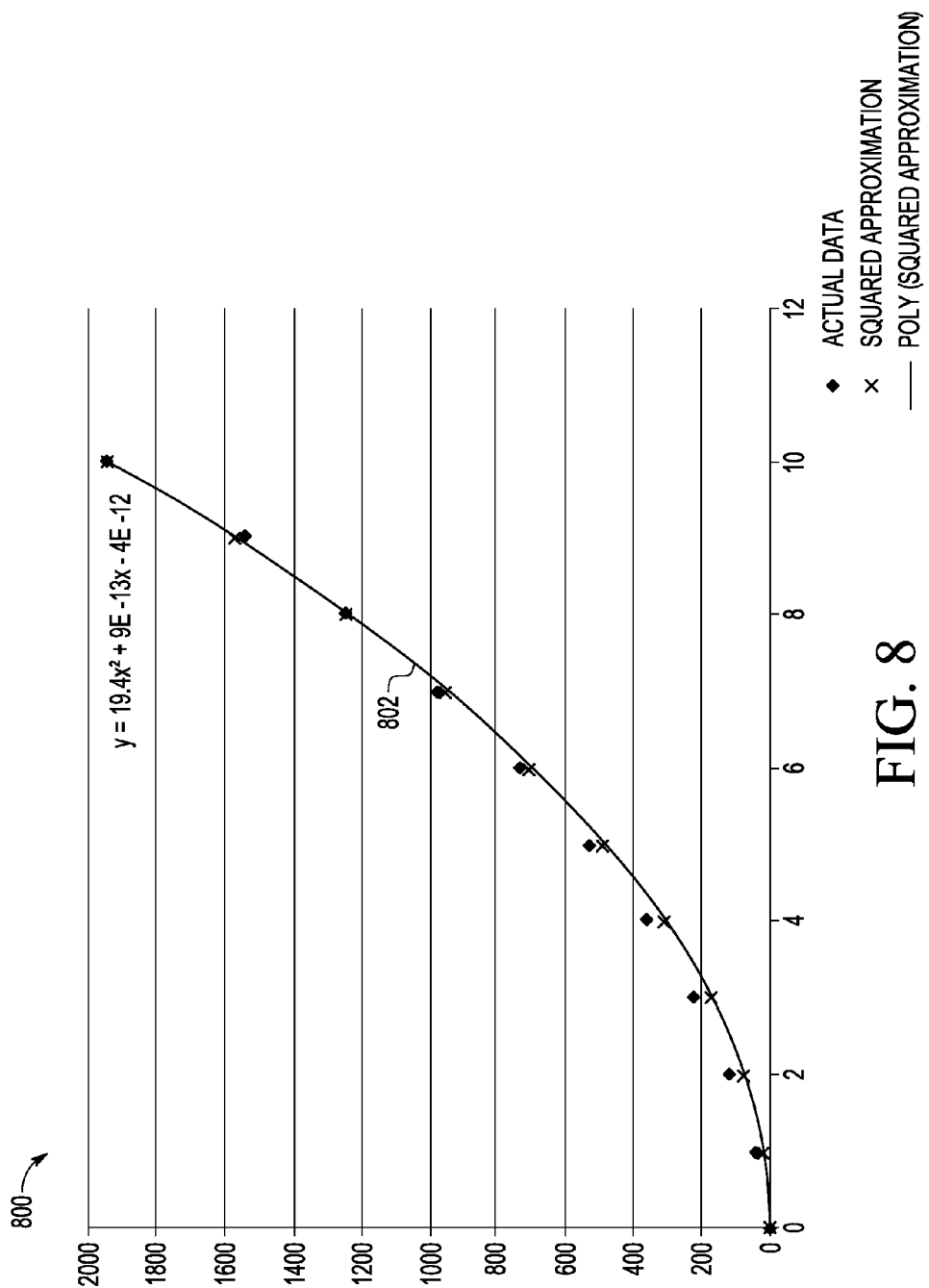
FIG. 8 is a graph showing experimental results of an equation for modeling touchscreen operation.

Referring to FIG. 8, a schematic graph illustrates an example of behavior or the signal delta over increasing distance. A sufficiently accurate approximation can be modeled by a quadratic function. For a single touch, the delta is equal to zero with no distance between the fingers so that a suitable approximation can be given by equations as follows:

$$\Delta x = K(\text{dist})^2, \text{ or}$$

$$\text{dist} = \sqrt{\Delta x / K}.$$

The K factor of the equation can be calculated in the calibration process by having the user touch two points parallel to one axis, near extreme locations of the screen.

FIG. 8 is a graph showing experimental results of an equation for modeling touchscreen operation. The graph 800 shows measured deltas indicative of the difference between acquired reference values and the instant values resulting when the screen is touched at two points with different separations. The separation operation is depicted in the X-axis and the delta is shown on the Y-axis. Actual data is shown by blue diamonds, which is approximated by the line 802 using a square function. The actual data and plotted function are sufficiently close that the square function equation is a suitable model.

Figure 9:
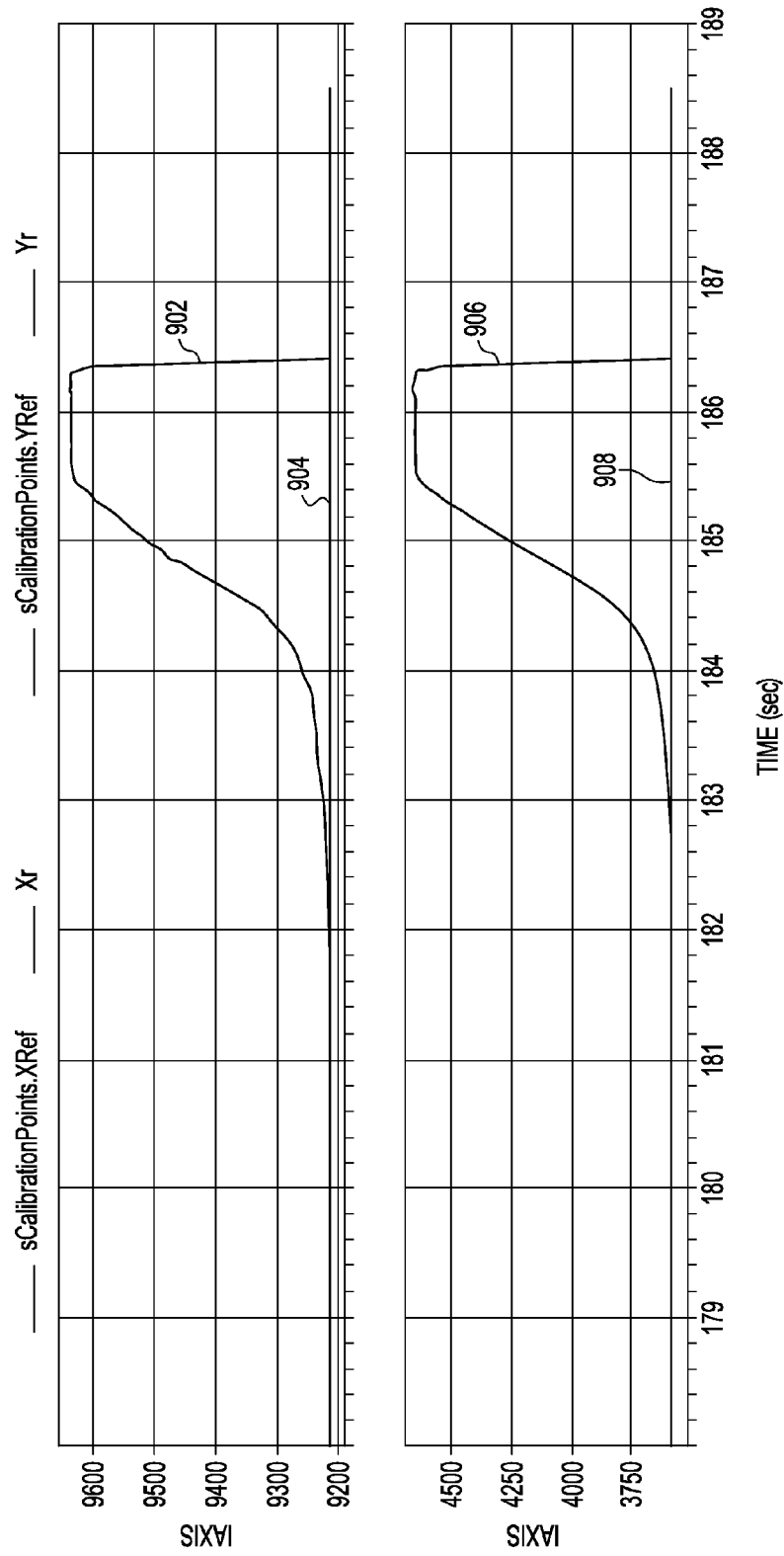
FIG. 9, including FIG. 9.1, includes schematic graphs depicting example results of an expand or zoom-in gesture performed on the touchscreen.
Figure 10:
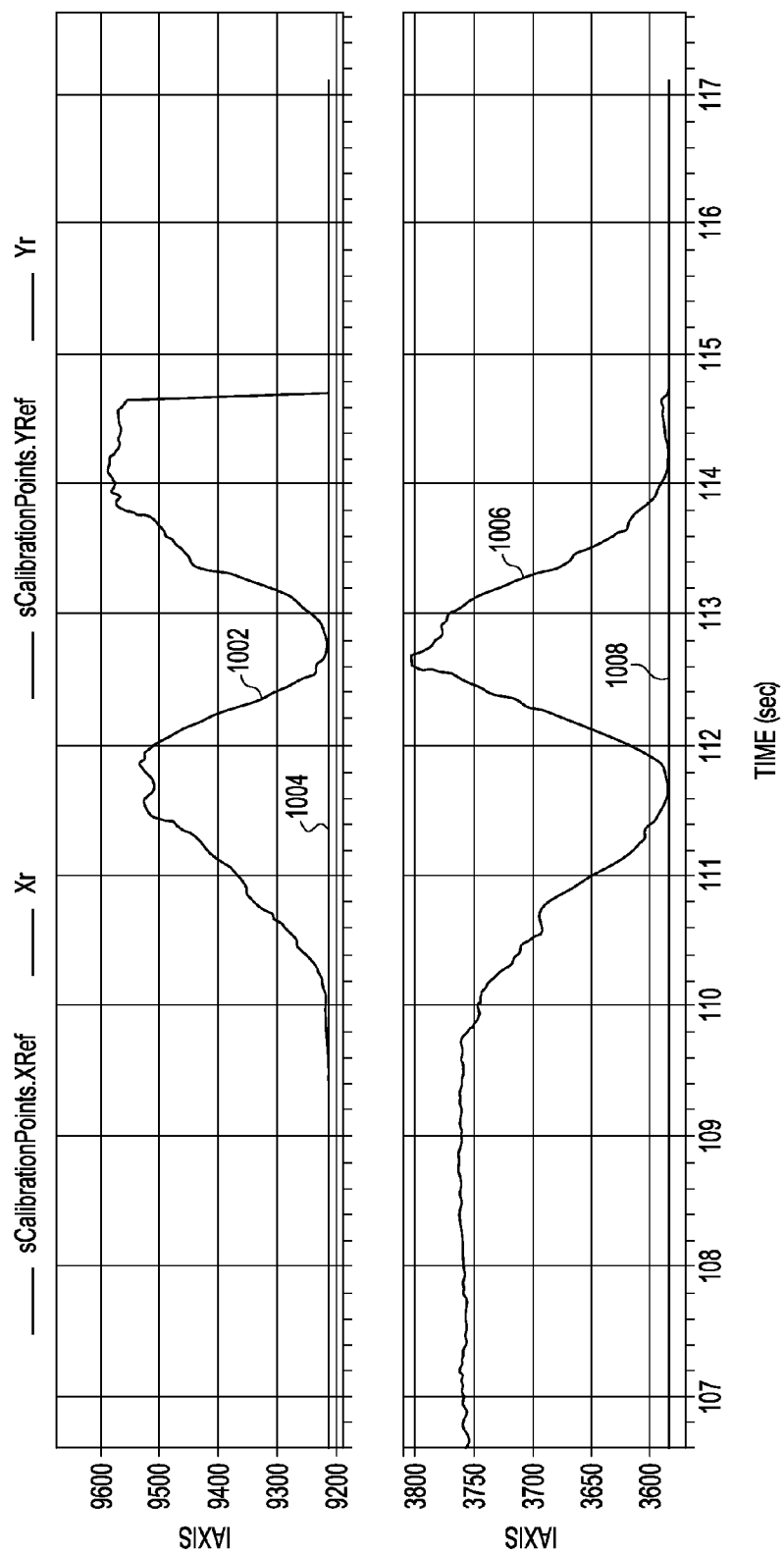
FIG. 10, including FIG. 10.1, includes schematic graphs showing how a rotate gesture can be executed on the touchscreen.

FIGS. 9 and 10 illustrate signal behavior for some touch gestures including zoom and rotate, and indicates how each gesture can be calculated. FIG. 9 uses the total distance and determines whether the distance becomes longer or shorter, thus showing whether the touches are moving closer or separating.

Referring to FIG. 9 including FIG. 9.1, schematic graphs depict example results of an expand or zoom-in gesture performed on the touchscreen. A graph shows the instant signals in the X-plane XR 902 and the Y-plane YR 906 and how the instant signals differ from the single-touch reference values Xref 904 and Yref 908 in the X and Y planes respectively.

Another graph shows calculated distances in each axis including the X distance 910 and Y distance 912, and the total distance Total 914 between the fingers.

Distances can be calculated using a squared root function, for example based on the Newton method or other suitable function and basis. Zoom can be detected by analyzing the total distance, which gives a linear measurement of the fingers distance.

A first graph on FIG. 9 shows variation of the instant values from the reference values when performing one gesture. A second graph of FIG. 9 illustrates values that are calculated based on the differences between the instant and reference values.

On the top side of the graph shows the total distance Total 914, with the lower portion showing X 910 and Y 912 distances.

FIG. 10, including FIG. 10.1, are schematic graphs showing how a rotate gesture can be executed on the touchscreen. The top graph shows a 270° rotate. The instant signals for the X-plane and Y-plane, respectively XR 1002 and YR 1006, are shown and illustrate differences from the signal touch reference values Xref 1004 and Yref 1008.

A second graph illustrates a 180° rotate with little radius variation including calculated distances in each axis, respectively X 1010 and Y 1012, and the total distance Total 1014 between the fingers. In an illustrative embodiment, the rotated angle can be calculated using a suitable function, such as a fixed point implementation of an arctangent (atan 2) function or other function.

And in the case of the rotate, the signals can behave as sine or cosine functions. Thus an arctangent function can be used to calculate the angle of the line that is formed between the two fingers. An initial angle can be taken and used for comparison as the fingers move to determine the angle of rotation of the movement.

In some embodiments, only resistors are added to the touchscreen and usage of operational amplifiers, multiplexers, and other components, for example external to the touchscreen, to control signal generation is avoided, thus avoiding additional expense and possibility of failure. The illustrative systems, devices, and techniques enable gesture interpretation outside of a host processor and avoid host signal processing. Furthermore, the illustrative systems, devices, and techniques further enable two-touch zoom-in, zoom-out, and rotation.

While the principles of the disclosed system are described above in connection with specific apparatus, it is to be clearly understood that this description is made only by way of example and not as a limitation on scope of the appended claims.

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. An electronic circuit comprising:
   a controller configured for coupling to a four-wires resistive touchscreen; and
   at least two resistive elements coupled to resistive circuits of the four-wires resistive touchscreen, wherein the controller is configured to
      detect multiple touches on the four-wires resistive touchscreen,
      measure zoom gestures comprising measuring distances between two-touches and calculating an angle of rotation and a total distance between the two-touches, and
      perform two-touch detection by virtue of being further configured to
         calibrate to calculate a plurality of touch calibration values comprising sampling for a single touch;
         repeat sampling of the single touch multiple times;
         capture two-touch delta for maximum distance in a first axis;
         capture two-touch delta for maximum distance in a second axis; and
         calculate distance resolution and touch calibration values corresponding to the first axis and the second axis by calculating distances according to at least equations (1) (X axis physical distance)$^2$ times $K_x$ is equal to an X two-touch delta, and (2) (Y axis physical distance)$^2$ times $K_y$ is equal to a Y two-touch delta, wherein $K_x$ and $K_y$ are touch calibration values.

2. The electronic circuit according to claim 1 further comprising:
   a four-wires resistive touchscreen; and
   at least two external resistive elements coupled to the four-wires resistive touchscreen.

3. The electronic circuit according to claim 1 further comprising:
   a four-wires resistive touchscreen comprising first and second terminals coupled to a first resistive sheet, and third and fourth terminals coupled to a second resistive sheet; and
   at least two external resistive elements comprising a first external resistive element coupled to the first resistive sheet and a second external resistive element coupled to the second resistive sheet.

4. The electronic circuit according to claim 1 wherein the controller is configured to receive information from the resistive touchscreen and processes the information to detect two-touch gestures in absence of external active components.

5. The electronic circuit according to claim 1 wherein the controller is configured to
   receive information from the resistive touchscreen;
   processes the information to detect zoom-in, zoom-out, and rotate two-touch gestures; and
   report the processed information through serial communications to an external host.

6. An electronic circuit comprising:
a controller configured for coupling to a four-wires resistive touchscreen; and
at least two resistive elements coupled to resistive circuits of the four-wires resistive touchscreen, wherein the controller is configured to
detect multiple touches on the four-wires resistive touchscreen,
measure zoom gestures comprising measuring distances between two-touches and calculating an angle of rotation and a total distance between the two-touches, and
perform two-touch detection by virtue of being further configured to
calibrate to calculate two-touch calibration values comprising sampling for a single touch;
repeat sampling of the single touch multiple times;
calculate a single touch reference value;
capture two-touch delta for maximum distance in a first axis;
capture two-touch delta for maximum distance in a second axis; and
calculate distance resolution and calibration values corresponding to the first axis and the second axis by calculating distances according to at least equations (1) (X axis physical distance)$^2$ times $K_x$ is equal to an X two-touch delta, and (2) (Y axis physical distance)$^2$ times $K_y$ is equal to a Y two-touch delta, wherein $K_x$ and $K_y$ are touch calibration values.

7. An electronic circuit comprising:
a controller configured for coupling to a four-wires resistive touchscreen; and
at least two resistive elements coupled to resistive circuits of the four-wires resistive touchscreen, wherein the controller is configured to
detect multiple touches on the four-wires resistive touchscreen,
measure zoom gestures comprising measuring distances between two-touches and calculating an angle of rotation and a total distance between the two-touches, and
perform two-touch detection by virtue of being further configured to
calculate touchscreen X-axis and Y-axis finger separation comprising calculating instant delta dX for the X-axis and instant delta dY for the Y-axis;
calculate X and Y distance wherein X-distance is equal to the square root of instant delta X (dX) divided by a calibration value Kx and Y-distance is equal to the square root of instant-delta Y (dY) divided by a calibration value KY; and
calculate total distance as the square root of the sum of the squares of X-distance and Y-distance.

8. The electronic circuit according to claim 7 wherein the controller is further configured to execute two-touch detection by virtue of being further configured to
track two-touch reference values by:
determining whether the at least two resistive elements are present;
measuring initial two-touch reference values;
determining whether a predetermined tracking period is elapsed;
determining whether the four-wires resistive touchscreen is touched;
receiving resistance samples; and
filtering the resistance samples using reference values.

9. The electronic circuit according to claim 8 wherein the controller is configured to execute two-touch detection further comprising tracking two-touch reference values periodically in absence of touch.

10. The electronic circuit according to claim 7 wherein the controller is further configured to execute two-touch detection by calculating distances as the square root of the sum of the squares of X-distance and Y-distance.

11. A method for performing two-touch gesture detection comprising:
receiving signals from a four-wires resistive touchscreen and at least two resistors;
detecting multiple touches on the four-wires resistive touchscreen;
measuring zoom gestures by
measuring distances between two-touches, and
calculating an angle of rotation and a total distance between the two-touches; and
calibrating to calculate a plurality of touch calibration values by
sampling for a single touch,
repeating sampling of the single touch multiple times,
capturing two-touch delta for maximum distance in a first axis,
capturing two-touch delta for maximum distance in a second axis; and
calculating distance resolution and calibration values corresponding to the first axis and the second axis by calculating distances according to at least equations (1) (X axis physical distance)$^2$ times $K_x$ is equal to an X two-touch delta, and (2) (Y axis physical distance)$^2$ times $K_y$ is equal to a Y two-touch delta, wherein $K_x$ and $K_y$ are touch calibration values.

12. The method according to claim 11 further comprising:
two-touch reference values by
determining whether the at least two resistors are present,
measuring initial two-touch reference values,
determining whether a predetermined tracking period is elapsed,
determining whether the four-wires resistive touchscreen is touched,
receiving resistance samples, and
filtering the resistance samples using reference values.

13. A method for performing two-touch gesture detection comprising:
receiving signals from a four-wires resistive touchscreen and at least two resistors;
detecting multiple touches on the four-wires resistive touchscreen;
measuring zoom gestures by
measuring distances between two-touches and
calculating an angle of rotation and a total distance between the two-touches; and
calculating touchscreen X-axis and Y-axis finger separation comprising delta dX for the X-axis and instant delta dY for the Y-axis by
calculating X and Y distance wherein X-distance is equal to the square root of instant delta X (dX) divided by a calibration value $K_X$ and Y-distance is equal to the square root of instant-delta Y (dY) divided by a calibration value $K_Y$, and
calculating total distance as the square root of the sum of the squares of X-distance and Y-distance.

14. The method according to claim 13 further comprising:
tracking two-touch reference values periodically in absence of touch;

calculating distances as the square root of the sum of the squares of X-distance and Y-distance;
detecting zoom as a linear measurement of touch distance by analyzing total distance; and
executing a rotate gesture, wherein the rotate gesture comprises:
calculating distances in an X-axis and a Y-axis and total distance between touches; and
calculating rotating angle.

* * * * *